United States Patent [19]

Sugiura et al.

[11] 4,136,821

[45] Jan. 30, 1979

[54] METHOD AND APPARATUS FOR RECOGNIZING CODE INFORMATION

[75] Inventors: Akio Sugiura, Nagoya; Atutoshi Okamoto, Toyohashi; Tadao Nojiri, Kariya, all of Japan

[73] Assignee: Nippondenso Co., Ltd., Kariya, Japan

[21] Appl. No.: 818,669

[22] Filed: Jul. 25, 1977

[30] Foreign Application Priority Data

Sep. 1, 1976 [JP] Japan .................................. 51-104398

[51] Int. Cl.² .......................... G06K 7/14; G03B 7/08; G06K 5/00
[52] U.S. Cl. .................................. 235/462; 235/454; 235/437; 250/568; 354/25
[58] Field of Search ................ 250/568, 569; 235/383, 235/385, 375, 454, 437, 462; 35/48 R, 48 B; 340/146.3 F, 146.3 J, 149 A, 152 R; 354/25

[56] References Cited

U.S. PATENT DOCUMENTS

| 2,928,953 | 3/1960 | Bassler | 235/454 |
| 3,643,066 | 2/1972 | Coliz | 235/454 |
| 3,676,645 | 7/1972 | Fickenscher | 235/437 |
| 3,896,304 | 7/1975 | Aoki | 354/25 |

*Primary Examiner*—Robert M. Kilgore
*Attorney, Agent, or Firm*—Cushman, Darby & Cushman

[57] ABSTRACT

A light source, a converging lens and a light responsive image sensor are optically coupled to recognize the code information such as bar codes recorded on an object. The light source supplies the code information with illumination light and the image sensor receives the reflected light through the converging lens to convert it into the image signal. The distance between the lens and the image sensor is adjusted automatically in response to the image signal such that clear reflected light is received by the image sensor, whereby correct information recognizing operation is attained.

5 Claims, 3 Drawing Figures

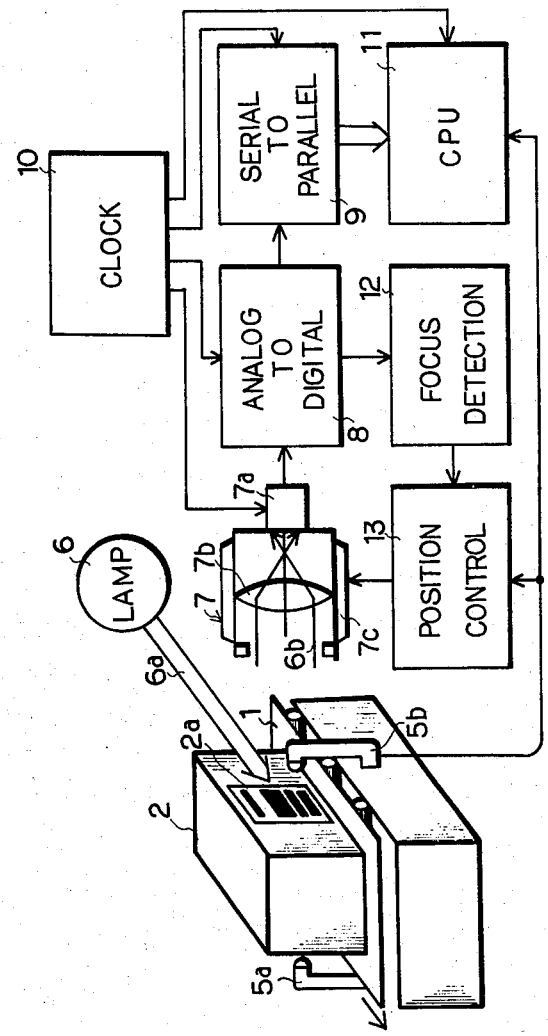

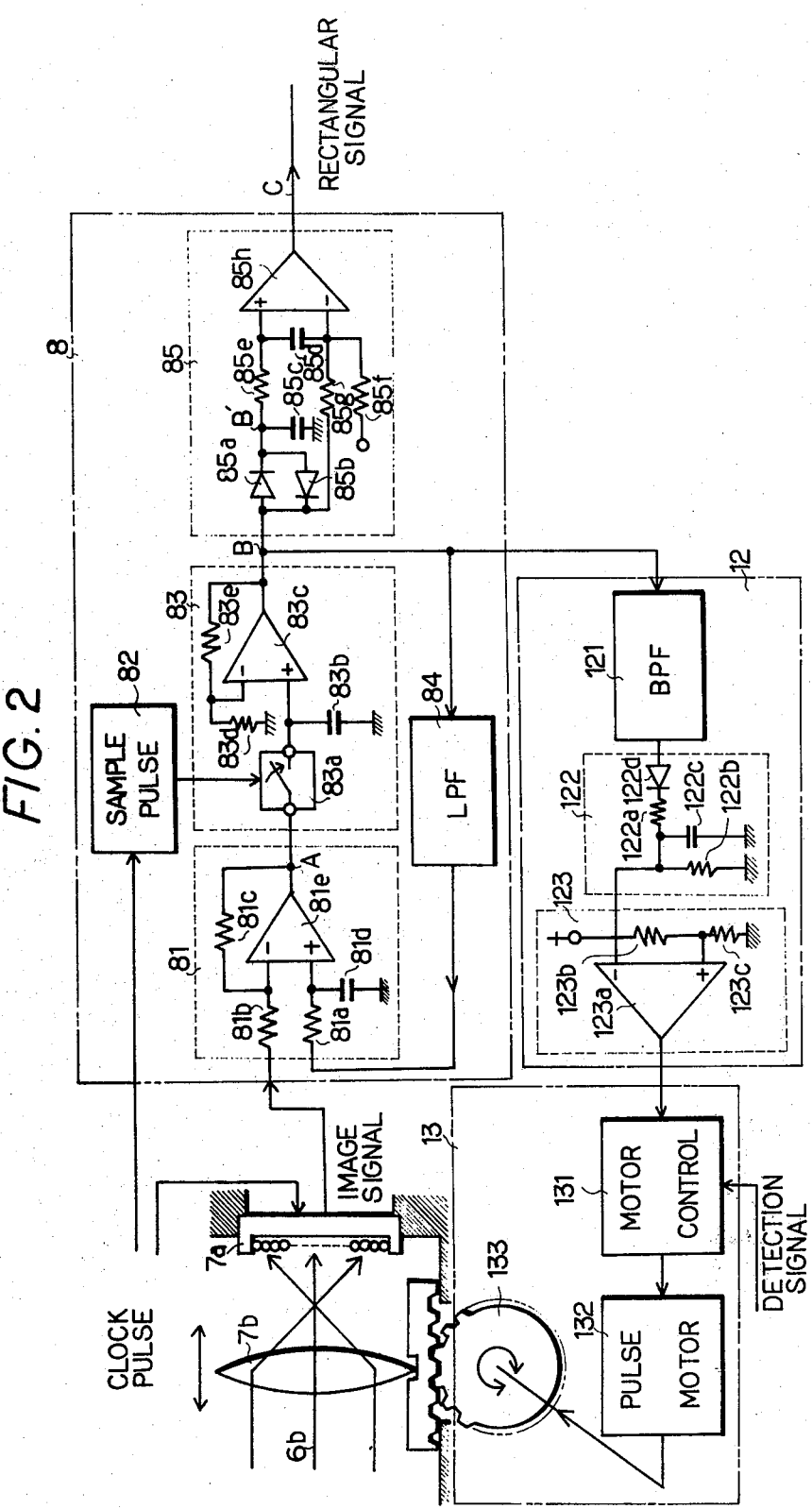

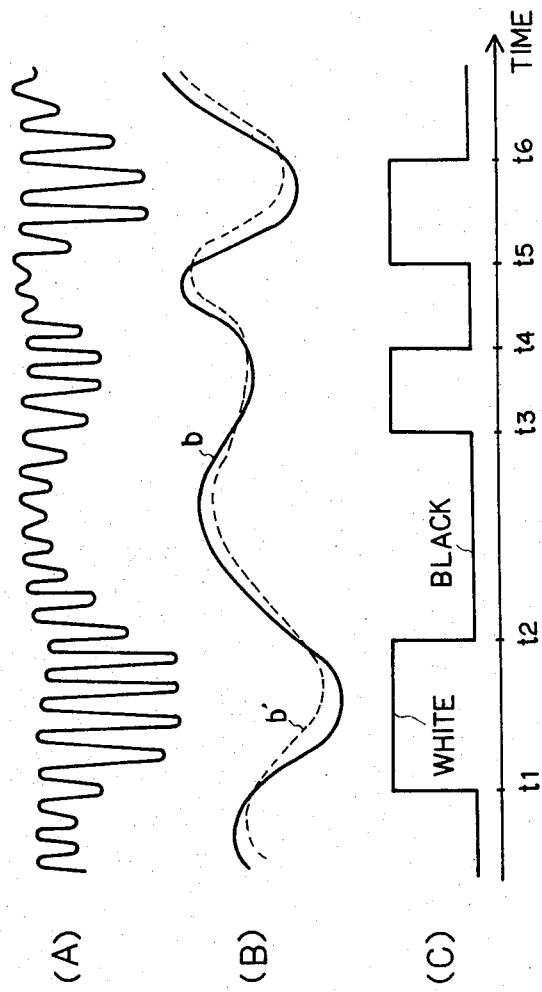

METHOD AND APPARATUS FOR RECOGNIZING CODE INFORMATION

BACKGROUND OF THE INVENTION

The present invention relates to a method and apparatus for optically recognizing code information, and more particularly to one in which the distance between a converging lens and a light responsive image sensor is adjusted automatically.

Information recognizing systems are known well in the art. According to one of these systems, an illumination light is supplied to a bar code to be reflected, and the reflected light is converged and received by a converging lens and a light responsive image sensor, respectively, which are optically coupled with each other. Since the reflected light has a light density corresponding to the light reflectivity of the bar code, the bar code is converted by the image sensor into an image signal which has a signal level corresponding to the density of reflected light. This image signal is then processed electrically for recognizing the bar code.

It has been a great disadvantage, however, that the image sensor is often unable to produce a correct image signal due to reflected light which is not clear in contrast. This drawback occurs when, for example, the converging lens is positioned too far from the bar code or the light responsive image sensor is positioned too far from the converging lens. In these occasions, it is necessary that clear reflected light is received by the light responsive image sensor through the converging lens so that the bar code is recognized correctly.

SUMMARY OF THE INVENTION

It is, therefore, a primary object of this invention to adjust the distance between a lens and an image sensor automatically.

It is another object of this invention to adjust the distance automatically in accordance with the image signal produced from the image sensor.

It is a further object of this invention to adjust the position of the lens when the level change of the image signal between contrastive reflected lights becomes small.

DESCRIPTION OF THE DRAWINGS

In the accompanying drawings:

FIG. 1 is a schematic diagram of the information recognizing system according to the present invention;

FIG. 2 is an electric wiring diagram illustrating the embodiment of the system shown in FIG. 1; and FIG. 3 is a chart illustrating signal waveforms (A), (B) and (C) for explanation of the operation of the embodiment shown in FIG. 2.

DESCRIPTION OF THE PREFERRED EMBODIMENT

Referring first to FIG. 1, a belt conveyer for carrying an object 2 thereon is shown by a reference numeral 1 and is provided with a light transmitter 5a and a light receiver 5b which are adapted to detect the existence of the object 2. On the side surface of the object 2 is attached a code label 2a on which a bar code is recorded by a combination of white bars and black bars which are contrastive in light reflectivity. Some of the bars are recorded to be wide and the other of the bars are recorded to be narrow, thus representing the content of the object 2. A light source 6 such as a reflector lamp is positioned to uniformly supply an illumination light 6a on the code label 2a. A scanning unit 7 is positioned to receive the reflected light 6b from the code label 2a. The scanning unit 7 is comprised of a light responsive image sensor 7a for converting the reflected light 6b into an electric image signal, a converging lens 7b for converging the reflected light 6b incident thereto and an adjusting mechanism 7c for adjusting the position of the lens 7b to and from the imager sensor 7a. The image sensor 7a has a plurality of light responsive elements alignment straight. The light responsive elements are driven one by one intermittently in the direction transverse to the bar extending direction by a train of clock pulses produced from a clock circuit 10 and produce a train of image signals each of which has a signal level corresponding to the density of the reflected light 6b. When the illumination light 6a is reflected by the black bar, the image signal has a small amplitude. When, on the contrary, the illumination light 6a is reflected by the white bar, the image signal has a large amplitude.

An analog-to-digital conversion circuit 8 is connected to receive the image signals and clock pulses from the image sensor 7a and the clock circuit 10, respectively, for converting the intermittent image signal into a continuous signal and then into a train of rectangular signals. A serial-to-parallel conversion circuit 9 is connected to receive the rectangular signals and clock pulses from the A-D conversion circuit 8 and the clock circuit 10, respectively, for converting the serially-applied rectangular signals into parallel digital signals which are available for code recognizing operation of a central processing unit 11 which is a digital computer having a code decoding program.

Connected further to the A-D conversion circuit 8 is a focus detection circuit 12 for detecting the focus position of the converging lens 7b in response to the level change of the image signal or the continuous analog signal. The focus detection circuit 12 produces a deviation signal while the focus position of the lens 7b is detected to be deviated from the appropriate position by which clear reflected light is received by the image sensor. A position control circuit 13 is connected to receive the deviation signal from the focus detection circuit 12 and coupled to control the operation of the adjusting mechanism 7c.

To describe the invention in greater detail, reference is made next to FIGS. 2 and 3.

As shown in FIG. 2, the A-D conversion circuit 8 is comprised of an amplifier 81, a sampling pulse generator 82, a sample hold circuit 83, a low pass filter 84 and a reshape circuit 85. The amplifier 81 is constituted by resistors 81a, 81b and 81c, a capacitor 81d and an operational amplifier 81e. The image signal is applied from the image sensor 7a to the operational amplifier 81e through the resistor 81b to be differentially amplified thereby. The output signal of the amplifier 81, appearing at a point A, is shown in (A) of FIG. 3 on condition that the clear reflected light is received by the image sensor 7a through the lens 7b. As can be seen from the signal waveform (A) of FIG. 3, the output signal is intermittent and the signal amplitude, lower peak level thereof, corresponds to the color of the bar. The sample hold circuit 83 connected in series to the amplifier 81 is constituted by an analog switch 83a, a capacitor 83b, an operational amplifier 83c and resistors 83d and 83e. The analog switch 83a is connected to the sampling pulse generator 82 which generates a sampling pulse in response to the clock pulse. The frequency of the sampling pulse is equal to that of the clock pulse applied to the image sensor 7a but the time width of the sampling pulse is much shorter than that of the clock pulse. The analog switch 83d closes only when the sampling pulse is applied, allowing only the lower peak level of the output signal of the amplifier 81 to be applied to the capacitor 83b therethrough. The capacitor 83b then holds this signal level until the analog switch 83d closes again. The signal across the capacitor 83b is amplified by the operational amplifier 83c. The sample hold circuit 83, thus sampling and holding the intermittent output signal of the amplifier 81, produces at a point B the continuous output signal b which is shown in (B) of FIG. 3. It must be noticed that the low pass filter 84 which constitutes a negative feedback loop is connected across the output stage of the sample hold circuit 83 and the input stage of the amplifier 81. The cut-off frequency of this filter 84 is set to be lower than one tenth (28KH$_z$) of the clock pulse frequency (280KH$_z$). The frequency component of the signal appearing at the point B lower than the cut-off frequency is passed through the filter 84 but the frequency component higher than the cut-off frequency is cut off. Therefore noise of low frequency is excluded by the amplifier 81, resulting in the noise-excluded output signal b shown in (B) of FIG. 3. The reshape circuit 85 connected in series to the sample hold circuit 83 is constituted by diodes 85a and 85b, capacitors 85c and 85d, resistors 85e, 85f and 85g and a comparator 85h. The diodes 85a and 85b are connected oppositely and parallelly with each other for suppressing the amplitude of the output signal applied from the sample hold circuit 83. The suppressed signal is then delayed by the cooperation of the diodes 85a and 85b and a capacitor 85c. The signal b' appearing at a point B', across the capacitor 85c, is shown in (B) of FIG. 3 with the dotted line. The comparator 85h is applied with the signal b' and the signal b at the respective non-inverting (+) and inverting (−) input terminals and produces at a point C the rectangular signal as shown in (C) of FIG. 3. The level of the rectangular signal becomes high when the suppressed signal b' exceeds the signal b, whereas it becomes low when the latter exceeds the former. The high and low levels of the rectangular signal are respectively indicative of the white and black bars. The time intervals $t_1$–$t_2$ and $t_2$–$t_3$ are approximately proportional to the wide bar, whereas the time intervals $t_3$–$t_4$, $t_4$–$t_5$ and $t_5$–$t_6$ are also approximately proportional to the narrow bar, since the scanning speed is constant and the scanning direction is transverse to the bar extending direction. This operation is repeated while the image sensor 7a receives the reflected light 6b, since the image sensor 7a is driven repeatedly.

The abovedescribed signal processing is available on condition that the reflected light 6b received by the image sensor 7a is clear enough owing to the appropriate focus position of the lens 7b.

To describe automatic focus position control in greater detail, reference is made to the focus detection circuit 12 and the position control circuit 13 shown in FIG. 2.

The focus detection circuit 12 is comprised of a band pass filter 121, a rectifier smoothing circuit 122 and a discrimination circuit 123. The band pass filter 121, connected to receive the continuous analog signal b shown in (B) of FIG. 3 from the sample hold circuit 83, produces the a.c. signal component of the analog signal b, cutting off the signal components which are too high and too low in frequencies. The rectifier smoothing circuit 122, constituted by resistors 122a and 122b, a capacitor 122c and a diode 122d, produces output signal, rectifying the output signal of the band pass filter 121 by the diode 122d and smoothing the rectified signal by the resistors 122a and 122b and the capacitor 122c. It must be understood herein that the output signal level of the rectifier smoothing circuit 122 becomes high as the output level change of the continuous analog signal b becomes large. In other words, the output signal level of the circuit 122 becomes high as the focus position of the lens 7b approaches the most appropriate position, since scanning the clear reflected light 6b results in a large level change of the analog signal b. The discrimination circuit 123, constituted by a comparator 123a and resistors 123b and 123c, discriminates whether the reflected light 6b received by the image sensor 7a is clear or not. When the output signal level of the rectifier smoothing circuit 122 is lower than the threshold level determined by the resistors 123b and 123c, the comparator 123a produces a deviation signal which has high signal level and indicates that the focus position of the lens 7b is too far from or too close to the image sensor 7a. When the output signal level of the circuit 122 is higher than the threshold level, on the contrary, the deviation signal is not produced, indicating that the focus position of the lens 7b is appropriate.

The position control circuit 13 is comprised of a motor control circuit 131, pulse motor 132 and a toothed gear wheel 133 which is engaged with the toothed rack of the adjusting mechanism. The motor control circuit 131 is connected to receive the detection signal which is produced by the light receiver 5b shown in FIG. 1 and indicates that the object 2 is carried to be scanned. In response to the detection signal, the pulse motor 132 is rotated in a predetermined direction until the lens 7b is initially moved to a predetermined position, the closest position to or the farthest position from the image sensor 7a. With the lens 7b thus positioned initially, the image sensor 7a is unable to receive clear reflected light 6b and resultantly the deviation signal is produced from the focus detection circuit 12. In response to the deviation signal, the motor control circuit 131 rotates the pulse motor 132 in the opposite direction this time. The toothed gear wheel 133 coupled to the pulse motor 132, as a result, moves the lens 7b from the initial position, engaging with the adjusting mechanism 7c. When the lens 7b is moved to a position where clear reflected light 6b is received by the image sensor 7a, the deviation signal is not produced any more by the focus detection circuit 12 and the further movement of the lens 7b is prevented. With the lens 7b positioned thus at the appropriate position, the abovedescribed operation of the A-D conversion circuit 8 is attained.

The abovedescribed embodiment may be so modified as well that the position of the image sensor 7a is adjusted in the same manner as described.

What we claim is:

1. A system for recognizing code information comprising:
   a light source for supplying illumination light on an object on which code information is recorded by a combination of two different bar widths in two light reflective colors;
   a converging lens adapted to converge the reflected light produced by said code information;
   means for producing clock pulses;

an image sensor comprising a plurality of light response elements each optically coupled with said converging lens and driven one by one in a direction transverse to the bar extending direction for receiving said reflected light through said converging lens and producing an image signal which has a signal level changing in accordance with the density of said reflected light;

means for sampling said image signal in synchronization with said clock pulses to thereby produce continuous analog signals;

a focus detection circuit, connected to said image sensor, for detecting the level change of said continuous analog signal and producing a deviation signal when the detected value of said level change is less than a predetermined reference value; and distance control means, connected to said focus detection circuit, for controlling the distance between said converging lens and said image sensor in response to said deviation signal.

2. A system according to claim 1, wherein said focus detection circuit includes:

filtering means for cutting off the direct current component of said analog signal;

smoothing means for producing a smoothed signal which changes the signal level thereof in accordance with the remaining component of said analog signal passed through said filter means; and comparing means for comparing the level of said smoothed signal with said predetermined reference value.

3. A system according to claim 2, wherein said distance control means includes:

an electric motor adapted to rotate while said deviation signal is produced by said focus detection circuit; and a gear mechanism, mechanically coupled between said electric motor and said converging lens, for laterally moving the latter during the rotation of the former.

4. A method for recognizing code information recorded by a combination of two different bar widths in two different light reflective colors comprising the steps of:

supplying said code information with illumination light from a light source;

converging the reflected light by a lens, said reflected light having the density corresponding to said light reflective colors;

producing clock pulses of a fixed frequency;

converting the density of said reflected light converged by said lens into image signals by a plurality of light responsive elements which are driven one by one in response to said clock pulses in a direction transverse to the bar extending direction;

sampling said image signal in synchronization with said clock pulses to thereby produce continuous analog signals which change the signal level thereof in accordance with the level of said image signals;

converting said continuous analog signals into rectangular digital signals having the signal level and duration indicative of said colors and widths of bars of said code information;

detecting the value of level change of said continuous analog signal;

comparing said value detected by said detecting step with a predetermined reference value; and controlling the distance between said lens and said light responsive elements in accordance with the result of said comparing step.

5. An apparatus for recognizing code information recorded by a combination of two different bar widths in two different light reflective colors comprising:

a light source for supplying said code information with illumination light;

lens means for converging the reflected light, said reflected light having a density corresponding to said light reflective colors;

means for producing clock pulses of a fixed frequency;

a plurality of light responsive elements for converting the density of said reflected light converged by said lens means into image signals;

means for driving said elements one by one in response to said clock pulses in a direction transverse to the bar extending direction;

means for sampling said image signal in synchronization with said clock pulses to thereby produce continuous analog signals which change in signal level thereof in accordance with the level of said image signals;

means for converting said continous analog signals into rectangular digital signals having a signal level and duration indicative of said colors and widths of bars of said code information;

means for detecting the value of level change of said continuous analog signal;

means for comparing said value detected by said detecting means with a predetermined reference value; and means for controlling the distance between said lens means and said light responsive elements in accordance with the result of the comparison.

* * * * *